(12) United States Patent
Jang et al.

(10) Patent No.: US 11,389,031 B2
(45) Date of Patent: Jul. 19, 2022

(54) PACKING CONTAINER FOR FOOD

(71) Applicants: Ki Soo Jang, Seoul (KR); Kyungtae Chung, Gunpo-si (KR); Haengsuk Han, Yeonggwang-gun (KR)

(72) Inventors: Ki Soo Jang, Seoul (KR); Kyungtae Chung, Gunpo-si (KR); Haengsuk Han, Yeonggwang-gun (KR)

(*) Notice: Subject to any disclaimer, the term of this patent is extended or adjusted under 35 U.S.C. 154(b) by 40 days.

(21) Appl. No.: 17/078,245

(22) Filed: Oct. 23, 2020

(65) Prior Publication Data
US 2021/0153694 A1    May 27, 2021

(30) Foreign Application Priority Data
Nov. 27, 2019   (KR) .................... 20-2019-0004793

(51) Int. Cl.
A47J 43/24   (2006.01)
B65D 1/24    (2006.01)
B65D 25/02   (2006.01)

(52) U.S. Cl.
CPC .............. A47J 43/24 (2013.01); B65D 1/24 (2013.01); B65D 25/02 (2013.01)

(58) Field of Classification Search
CPC ............ A47J 43/24; B65D 1/24; B65D 25/02
USPC ................... 220/23.83, 23.87, 23.89, 501
See application file for complete search history.

(56) References Cited

U.S. PATENT DOCUMENTS

| | | | | |
|---|---|---|---|---|
| 5,156,084 A * | 10/1992 | Lin | ................ | A47J 43/24 366/279 |
| 5,778,769 A * | 7/1998 | Dodson | ............ | A47J 43/24 99/511 |
| 6,510,785 B1 * | 1/2003 | Margolin | ............ | F26B 5/08 494/60 |
| 7,467,718 B1 * | 12/2008 | Donohue | ............ | A47J 43/24 210/473 |
| 7,690,523 B2 * | 4/2010 | Harris | ............ | B65D 83/005 215/231 |

(Continued)

FOREIGN PATENT DOCUMENTS

| | | |
|---|---|---|
| JP | 3156363 U | 12/2009 |
| KR | 20-0364022 Y1 | 10/2004 |

(Continued)

OTHER PUBLICATIONS

Office Action dated Jan. 13, 2021 in Korean Application No. 20-2019-0004793.

*Primary Examiner* — J. Gregory Pickett
*Assistant Examiner* — Niki M Eloshway
(74) *Attorney, Agent, or Firm* — Sughrue Mion, PLLC

(57) ABSTRACT

Disclosed is a proposed packaging container for food comprising of: a container in a shape to contain a first food; a strainer part, through which a plurality of strainer holes passes and in which a second food distinct from the first food is contained, stacked on top of the container; and a cover configured to seal the container and strainer part, wherein a relatively protruding communication hole is formed in the center of the strainer part and communicates with the container to induce convection of steam throughout the package. According to such a configuration, the original state and taste of the packaged foods can be maintained even for long-term packaging, which contributes to the improvement of packaging quality.

9 Claims, 3 Drawing Sheets

(56) References Cited

U.S. PATENT DOCUMENTS

| | | | |
|---|---|---|---|
| 8,448,788 B2* | 5/2013 | Krasznai | A47J 43/0727 |
| | | | 206/505 |
| 2008/0210686 A1* | 9/2008 | Shapiro | B65D 1/34 |
| | | | 220/4.27 |
| 2008/0223226 A1* | 9/2008 | Holcomb | A47J 43/24 |
| | | | 74/25 |
| 2010/0139503 A1* | 6/2010 | Curtin | F26B 5/08 |
| | | | 99/501 |
| 2016/0095474 A1* | 4/2016 | Hauser | A47J 43/24 |
| | | | 99/495 |
| 2016/0192804 A1* | 7/2016 | Mesmer | A47J 27/04 |
| | | | 99/410 |
| 2018/0192827 A1* | 7/2018 | Fox, III | B65D 43/02 |
| 2020/0253426 A1* | 8/2020 | Terakawa | B65D 51/18 |

FOREIGN PATENT DOCUMENTS

| | | |
|---|---|---|
| KR | 20-2008-0005789 U | 12/2008 |
| KR | 20-2019-0001760 U | 7/2019 |

* cited by examiner

PACKING CONTAINER FOR FOOD

CROSS-REFERENCE TO RELATED APPLICATION

This application claims priority to Korean Patent Application No. 20-2019-0004793, filed on Nov. 27, 2019 in the Korean Intellectual Property Office, the disclosure of which is incorporated herein by reference.

BACKGROUND OF THE DISCLOSURE

Field of the Disclosure

The present invention relates to a packaging container for food, specifically a container that holds noodles separately from soup within the one package, in order to maintain the condition of the packaged foods regardless of storage duration.

Description of the Related Art

In recent years, packaging containers for packaging food have grown in prevalence as the popularity of food delivery has increased. The purpose of packaging containers for packaging food is to maintain the quality of the ingredients and taste of the food to be packaged for a certain time.

In regard to foods such as hot soup, the packaging container must be sealed for safety during transport. The taste and quality of the packaged food, however, may deteriorate due to the high-temperature and trapped steam within the sealed packaging container. In particular, when noodles are packaged immersed in hot soup, the volume of noodles rapidly increases, causing a significant deviation from the intended quality and taste.

Thus, in recent years, research to develop packaging containers with excellent packaging properties as well as the ability to maintain the taste of packaged food has been continuously conducted.

RELATED ART DOCUMENTS

Patent Documents

Korean Utility Model Publication No. 20-2008-0005789
Korean Utility Model Registration No. 20-0364022

SUMMARY OF THE DISCLOSURE

The present invention has been developed in light of the aforementioned problems, and the key objective of this invention is to provide a food packaging container capable of maintaining the condition of packaged food regardless of packaging duration while preserving excellent packaging properties.

One embodiment of the present invention addresses the aforementioned concerns with the provision of a packaging container for food that includes: a container shaped to contain the first food; a strainer part that will contain a second food stacked above the container; and lastly, a cover configured to tightly seal the top of the container and strainer part.

The proposed container may have a cylindrical shape so that the top of the container is open and the strainer part stacked on top, and then the cover can affix to both the strainer and the top of the container to tightly enclose the entire package. The container will contain the first food, which may include a liquid such as hot soup.

The proposed strainer part may be configured to have a diameter corresponding to the top of the container in order to be stacked but with a predetermined depth at which the first food in the container portion is not disrupted. The strainer part may contain a central guide protrusion protruding upwards toward the top of the container with a communication hole in the middle, which allows for the passage of steam throughout the package to help maintain the optimal temperature and quality of the foods. The subsequent concave regions formed around the guide protrusion would construct the strainer and be filled with multiple rows and columns of holes to also help induce steam convection. The second food, such as noodles, may then be contained within the concave regions of the strainer part.

The container, the strainer part, and the cover, may be developed with the same material; or the container and the strainer part developed with one material and the cover with another material.

In conclusion, the present invention describes a provision for a packaging container for food with three separate compartments: a container with an open top and a shape to hold the first food, including liquids; a strainer part to be stacked above the container with strainer holes as well as a central protruding communication hole to allow passage of steam from the first food to the second food, such as noodles, held within the strainer; and a cover configured to fit the top of the container and seal the entire package.

BRIEF DESCRIPTION OF THE DRAWINGS

The objectives, features, and other advantages of the present disclosure will be more clearly understood from the following detailed description in conjunction with the accompanying drawings.

DETAILED DESCRIPTION OF THE DISCLOSURE

Hereinafter, the present invention will be described in detail by explaining particular embodiments of the invention with references to the attached drawings. However, it should be understood that the spirit and scope of the present disclosure are not limited to the embodiments described and can be modified by addition, modification, or deletion of elements constituting the embodiments. Such additions, modifications, and deletions are also within the spirit and scope of the present disclosure.

Figure 1:
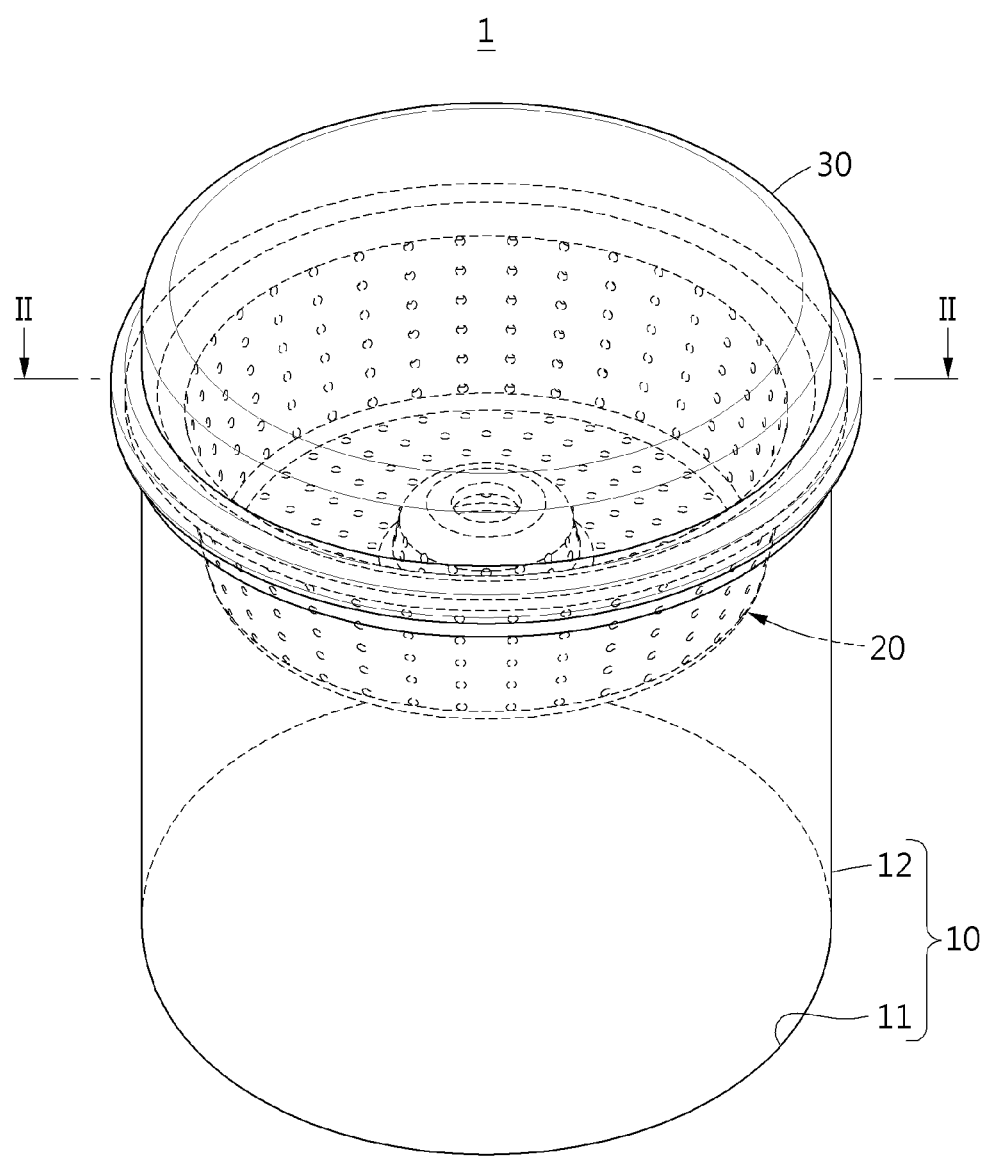
FIG. 1 is a perspective view schematically illustrating a packaging container (1) with preferred embodiments of the present invention.
Figure 2:
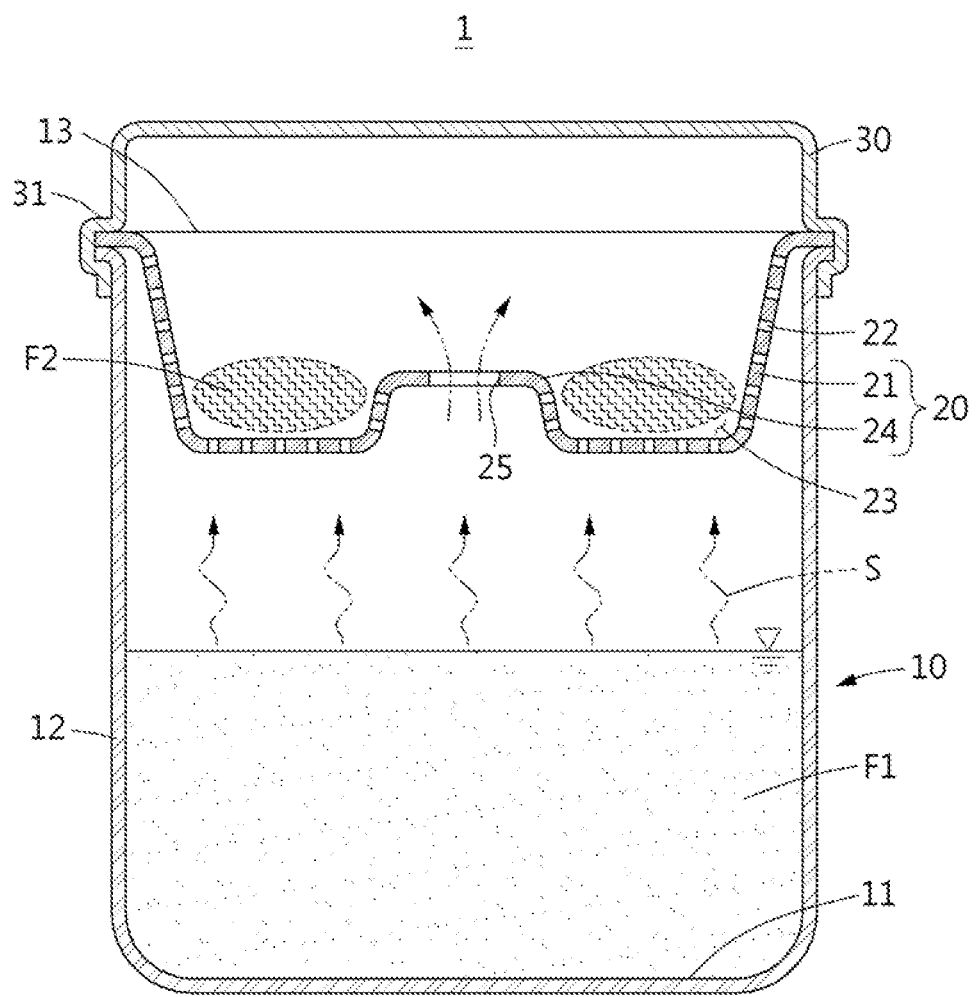
FIG. 2 illustrates a sectional view schematically taken along plane II-II of FIG. 1.
Figure 3:
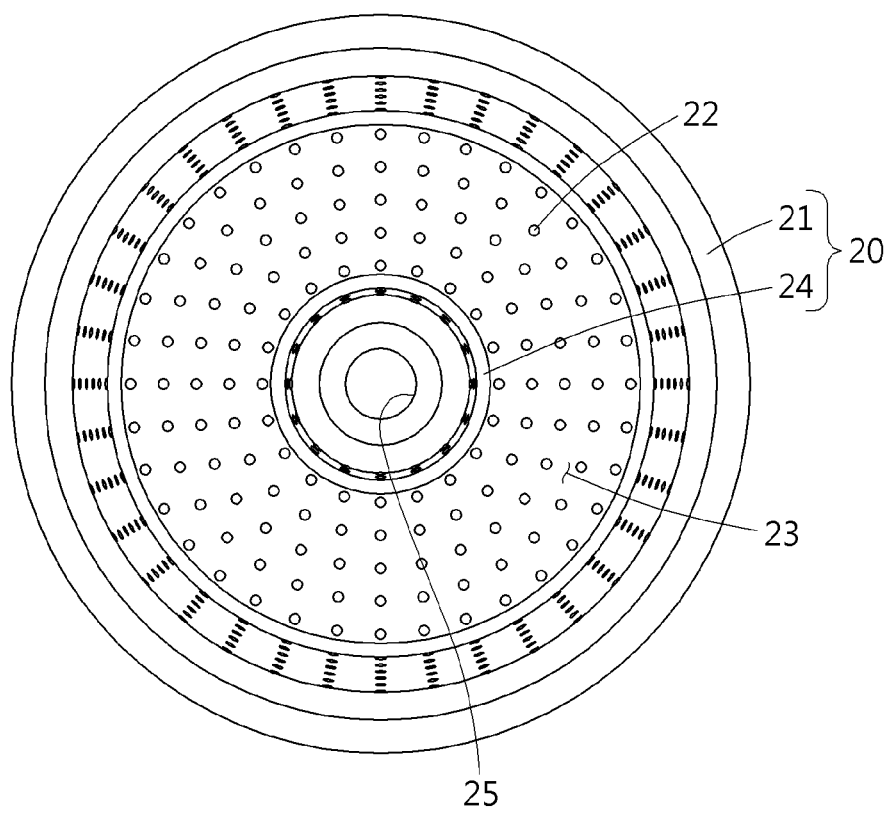
FIG. 3 is a top plan view schematically illustrating the strainer part of FIG. 1.

FIG. 1 is a perspective view schematically illustrating a preferred embodiment of the present invention as packaging container (1) for food. FIG. 2 illustrates a sectional view taken along the plane II-II of FIG. 1. FIG. 3 illustrates a top plan view of the strainer part of FIG. 1.

Referring to FIGS. 1 and 2, the packaging container (1) for food, according to a preferred embodiment of the present invention, includes a container (10), a strainer part (20) and a cover (30).

For reference, the present invention illustrates and exemplifies the food packaging container (1) for packing both a liquid-type first food (F1; see FIG. 2), such as soup or broth, and a second food (F2; see FIG. 2), such as noodles. However, the scope of the present invention is not limited thereto, and the packaging container (1) for food may be naturally modified to classify and package various foods, e.g., packaging non-liquid food separately from noodles.

The container (10) has a shape capable of containing the first food (F1), including a liquid such as soup. It has a substantially circular bottom surface (11) and a side surface (12) that extends upwards from the bottom surface, as shown in FIGS. 1 and 2, resulting in a cylindrical shape. The top of the container (13) has an open shape and may be closed by the cover (30) described below.

The strainer part (20) is stacked on top of the container (10). The strainer part (20) is made up of a strainer (21) with a plurality of strainer holes (22) passing through it and a central guide protrusion (24). The strainer (21) has a disk shape and serves to support the second food (F2). Heat and steam (S; hereinafter referred to as "water vapor") from the first food (F1) contained in the container (10) pass through the strainer holes (22). The second food (F2) is affected by the water vapor (S) passing through the strainer holes (22), thereby preventing the second food (F2; e.g., noodles) from sticking to the strainer part (20) or from swelling. The diameter of the strainer (21) is formed to correspond to the top (13) of the container (10), so that the strainer (21) may be stacked on the top (13) without falling into the container (10).

The guide protrusion (24) protrudes upward from the center of the strainer part (20), i.e., protrudes toward the cover (30). In the center of the guide protrusion, the communication hole (25) induces convection of the water vapor (S) from the first food (F1), contained in the container (10), through the strainer part (20) to the upper part of the container (10), as shown in FIG. 2.

For reference, the strainer holes (22) are formed in multiple rows and columns to be spaced from each other in the surface direction of the strainer (21) and the guide protrusion (24), as shown in FIG. 3, forming a plurality of penetrations.

The guide protrusion (24) is convexly formed in the center of the strainer part (20), and the concave regions (23) are relatively concavely formed in a circumferential direction around the guide protrusion (24) to form a disk shape. The concave regions (23) of the strainer (21) serve to support the second food (F2) such as noodles, so that the communication hole (25) of the guide protrusion (24) is not affected by the second food (F2).

The strainer (21) has a predetermined depth due to the concave regions (23). This measurement takes into consideration the depth at which the strainer (21) can be stacked on the open top (13) of the container and inserted into the container (10) without affecting the first food (F1) contained in the container (10).

The cover (30) closes and seals the container (10) and the strainer part (20). The cover (30) has a cover step (31) that grips and affixes to the top (13) of the container (10) with a cylindrical shape as shown in FIG. 2, thereby covering the top (13). Here, the cover step (31) is in close contact with the circular top (13) of the container (10), thereby tightly sealing the top (13) of the container (10), preventing leakage of the packaged foods (F1 and F2).

For reference, the cover step (31) of the cover (30) is extended by a predetermined length to not only encompass the top (13) of the container (10) but also the side surface (12), thereby improving sealing force to the container (10).

The container (10), the strainer part (20), and the cover (30) may be formed of the same material or of different materials. For example, all of the container (10), the strainer part (20) and the cover (30), may be formed of a plastic material, or only the strainer part (20) and the cover (30) may be formed of a plastic material and the container (10) may be made with a different material. In summary, materials of the container (10), the strainer part (20), and the cover (30), may be the same or different without specific limitations.

A sample operation of packaging with the packaging container 1 for food according to the present invention with the aforementioned configuration is described with reference to FIG. 2. The first food (F1) such as hot soup or broth is contained inside the cylindrical container (10). The second food (F2) such as noodles is contained in the strainer (21) portion of the strainer part (20), specifically within the concave regions (23) of the strainer (21), and the second food (F2) does not interfere with the communication hole (25) of the guide protrusion (24). The strainer part (20) holding the second food (F2) is stacked on the top (13) of the container (10) and is inserted into the container (10) to a predetermined depth. Accordingly, the strainer part (20) does not protrude from the top (13) of the container (10), nor does it affect the first food (F1) in the container (10).

After the first and second foods (F1 and F2) are placed in the container (10) and the strainer part (20) respectively, and the strainer part (20) is stacked onto the container (10), the cover (30) is placed over the top (13) of the container (10). Then, the cover step (31) of the cover (30) catches and fixes onto the top (13) of the container (10), thereby maintaining sealing force.

Once the inside of the container (10) is sealed by the cover (30), water vapor (S) is generated by heat and steam from the first food (F1), as shown in FIG. 2. The water vapor (S) passes through the strainer holes (22) of the strainer (21) and the communication hole (25) of the guide protrusion (24) provided in the center of the strainer part (20) to interact with the second food (F2) by convection. In particular, the water vapor (S), which originates from the first food (F1) and passes through the strainer holes (22), interacts with the lower part of the second food (F2) and simultaneously flows to the upper portion of the container (10) via the communication hole (25) and then descends by convection to affect the upper part of the second food (F2). Thus, the water vapor (S) generated from the first food (F1) is transferred over the entire area of the second food (F2), so that the original packaging state of the second food (F2) can be maintained without any change in volume or taste, regardless of packaging duration. In addition, the water vapor (S) of the first food (F1) is evenly transferred to the second food (F2), thereby keeping the second food (F2) warm.

As a result of the aforementioned configuration of the present invention, different types of foods such as soup and noodles can be contained and packaged in a way that provides excellent packaging properties compared to conventional packaging methods where noodles are immersed in the soup. This configuration prevents the increase in volume of the noodles due to immersion in soup, as the strainer includes a guide protrusion with a central communication hole to induce convection of steam generated from the soup to evenly affect the entirety of the noodles. Therefore, the original state, taste, and relative optimal temperature of the noodles can be maintained even for long-term packaging.

While the present invention has been described with preferred embodiments, those skilled in the art will appre-

| Legend: | |
|---|---|
| 1: packaging container for food | 10: container |
| 11: base of container | 12: side surface of container |
| 13: top of the container | 20: strainer part |
| 21: strainer | 22: strainer hole |
| 23: concave region | 24: guide protrusion |
| 25: communication hole | 30: cover |
| 31: cover step | II: Sectional plane illustrated in FIG. 2 |
| F1: first food | F2: second food |
| S: steam | |

What is claimed is:

1. A packaging container for food, comprising:

a container in a shape in which a first food is contained;

a strainer part that includes a central protruding communication hole to induce convection of steam along with a circumferential strainer area that contains a plurality of strainer holes for steam convection and an area to hold a second food different from the first food stacked onto the container; and a cover configured to seal the container and the strainer part, wherein the container has a cylindrical shape with a top of the container open, and the strainer part is stacked thereon, and the cover is provided with a cover step that grips and fixes to the top of the container and is configured to cover and seal the container, wherein the strainer part comprises:

a strainer configured to have a diameter corresponding to the top of the container and stacked on the top of the container; and a guide protrusion configured to protrude toward the cover from a center of the strainer and provided with the central protruding communication hole passing through the center, wherein the plurality of strainer holes pass through the strainer and the guide protrusion in multiple rows and columns while spaced from each other.

2. The packaging container according to claim 1, wherein the strainer is provided with concave regions formed to fit inside of the container in a circumferential direction around the guide protrusion, and the second food is contained in the concave regions.

3. The packaging container according to claim 1, wherein the container, the strainer part and the cover are formed of the same material, or at least one of the container, the strainer part, and the cover; is formed of a different material.

4. The packaging container according to claim 1, wherein the first food comprises a liquid, and the second food comprises noodles.

5. The packaging container according to claim 1, wherein the strainer part is inserted into the container to a depth at which the first food contained in the container is not affected.

6. A packaging container for food, the packaging container comprising:

a container with an open top and a shape in which a first food comprising a liquid is contained;

a strainer part provided with a plurality of strainer holes through which steam generated from the first food passes, stacked on a top of the container, and configured to contain a second food different from the first food; and a cover configured to cover the top of the container and seal the container and the strainer part, wherein the strainer part comprises a strainer provided with the plurality of strainer holes and concave regions in which the second food is contained; and a guide protrusion formed to relatively protrude from the concave regions and provided with a communication hole, through which the steam passes, in the center thereof, wherein the plurality of strainer holes pass through the strainer and the guide protrusion in multiple rows and columns to be spaced from each other.

7. The packaging container according to claim 6, wherein the strainer part is inserted to a predetermined depth from the top of the container, not to protrude from the top, and the cover is provided with a cover step that catches and fixes to the top of the container to cover the top of the container.

8. The packaging container according to claim 6, wherein the strainer is configured to have a diameter corresponding to the top of the container and stacked on the top of the container.

9. The packaging container according to claim 6, wherein the container, the strainer part, and the cover are formed of the same material, or at least one of the container, the strainer part and the cover is formed of a different material.

* * * * *